US012812573B2

(12) United States Patent
Ryu et al.

(10) Patent No.: US 12,812,573 B2
(45) Date of Patent: Nov. 24, 2026

(54) METHOD AND DEVICE FOR OPERATING WIRELESS COMMUNICATION SYSTEM ON BASIS OF BANDWIDTH

(71) Applicant: Samsung Electronics Co., Ltd., Suwon-si (KR)

(72) Inventors: Hyunseok Ryu, Suwon-si (KR); Suha Yoon, Suwon-si (KR); Youngbum Kim, Suwon-si (KR); Seho Myung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 18/579,665

(22) PCT Filed: Sep. 23, 2022

(86) PCT No.: PCT/KR2022/014247
§ 371 (c)(1),
(2) Date: Jan. 16, 2024

(87) PCT Pub. No.: WO2023/054986
PCT Pub. Date: Apr. 6, 2023

(65) Prior Publication Data

US 2024/0349212 A1 Oct. 17, 2024

(30) Foreign Application Priority Data

Sep. 29, 2021 (KR) ........................ 10-2021-0128939

(51) Int. Cl.
*H04W 56/00* (2009.01)
*H04L 5/00* (2006.01)
*H04L 27/26* (2006.01)

(52) U.S. Cl.
CPC ....... *H04W 56/0015* (2013.01); *H04L 5/0051* (2013.01); *H04L 27/26025* (2021.01)

(58) Field of Classification Search
CPC ........... H04W 56/0015; H04W 56/001; H04W 72/04; H04W 72/23; H04W 72/0453;
(Continued)

(56) References Cited

U.S. PATENT DOCUMENTS 10,797,919 B2 10/2020 Nguyen et al.
2020/0374840 A1 11/2020 Takeda et al.
(Continued)

OTHER PUBLICATIONS

International Search Report dated Dec. 29, 2022, issued in International Application No. PCT/KR2022/014247.
(Continued)

*Primary Examiner* — Liem H. Nguyen
(74) *Attorney, Agent, or Firm* — Jefferson IP Law, LLP

(57) ABSTRACT

The present disclosure relates to a 5G or 6G communication system for supporting a higher data transmission rate. The present disclosure relates to a method performed by a base station in a wireless communication system and, particularly, to a method and a device for performing same, the method comprising the steps of: identifying a frequency band; determining a size of a subcarrier spacing (SCS) to be used on the frequency band if a size of the frequency band is smaller than a preconfigured bandwidth size; generating a synchronization signal block (SSB) on the basis of the determined size of the SCS; and transmitting the SSB on the frequency band.

16 Claims, 15 Drawing Sheets

(58) Field of Classification Search
CPC ................. H04W 72/21; H04L 5/0051; H04L 27/26025; H04L 5/0053; H04L 5/00; H04L 5/0007
See application file for complete search history.

(56) References Cited

U.S. PATENT DOCUMENTS

| | | | | |
|---|---|---|---|---|
| 2021/0112552 | A1* | 4/2021 | Tiirola | H04L 5/14 |
| 2021/0153107 | A1* | 5/2021 | Xu | H04W 72/04 |
| 2021/0153209 | A1 | 5/2021 | Guan et al. | |
| 2021/0211340 | A1 | 7/2021 | Jung et al. | |
| 2021/0250882 | A1* | 8/2021 | Lin | H04L 5/0087 |
| 2021/0266119 | A1 | 8/2021 | Gou et al. | |
| 2021/0392592 | A1* | 12/2021 | Ko | H04W 72/0446 |
| 2023/0050913 | A1* | 2/2023 | Hong | H04L 27/26025 |
| 2023/0139778 | A1* | 5/2023 | Wang | H04L 1/0067 370/329 |
| 2023/0224921 | A1* | 7/2023 | Chen | H04W 48/16 |

OTHER PUBLICATIONS

Korean Office Action with English translation dated Jul. 28, 2026; Korean Appln. No. 10-2021-0128939.

* cited by examiner

| SCS | bandwidth |
|---|---|
| 15 kHz | 3.6 MHz |
| 30 kHz | 7.2 MHz |
| 120 kHz | 28.8 MHz |
| 240 kHz | 57.6 MHz |

METHOD AND DEVICE FOR OPERATING WIRELESS COMMUNICATION SYSTEM ON BASIS OF BANDWIDTH

TECHNICAL FIELD

The disclosure relates to a bandwidth-based wireless communication system operation method and device. More specifically, the disclosure relates to a method and a device for enabling a wireless communication system (e.g., 5G or new radio (NR)) to operate even in a narrower bandwidth.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial state of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The technical task to be achieved in various embodiments of the disclosure is to provide a bandwidth-based wireless communication system operation method and device.

In addition, the technical task to be achieved in various embodiments of the disclosure is to provide a synchronization method for operating a wireless communication system in a narrower bandwidth, and a method and a device for configuring a parameter to support a narrower bandwidth and performing communication by using the same.

Solution to Problem

An embodiment of the disclosure may provide a method performed by a base station in a wireless communication system, the method including: identifying a frequency band; when a size of the frequency band is smaller than a size of a preconfigured bandwidth, determining a size of a subcarrier spacing (SCS) to be used on the frequency band;

generating a synchronization signal block (SSB), based on the determined size of the SCS; and transmitting the SSB on the frequency band.

In addition, an embodiment of the disclosure may provide a method performed by a terminal in a wireless communication system, the method including: identifying a frequency band; when a size of the frequency band is smaller than a size of a preconfigured bandwidth, determining a size of a subcarrier spacing (SCS) to be used on the frequency band; detecting a synchronization signal block (SSB), based on the determined size of the SCS; and identifying synchronization, based on the SSB.

In addition, an embodiment of the disclosure may provide a base station in a wireless communication system, the base station including: a transceiver; and a controller, wherein the controller is configured to perform control to: identify a frequency band; when a size of the frequency band is smaller than a size of a preconfigured bandwidth, determine a size of a subcarrier spacing (SCS) to be used on the frequency band; generate a synchronization signal block (SSB), based on the determined size of the SCS; and transmit the SSB on the frequency band.

In addition, an embodiment of the disclosure may provide a terminal in a wireless communication system, the terminal including: a transceiver; and a controller, wherein the controller is configured to perform control to: identify a frequency band; when a size of the frequency band is smaller than a size of a preconfigured bandwidth, determine a size of a subcarrier spacing (SCS) to be used on the frequency band; detect a synchronization signal block (SSB), based on the determined size of the SCS; and identify synchronization, based on the SSB.

The technical tasks to be achieved in various embodiments of the disclosure are not limited to the above-mentioned technical tasks, and other technical tasks not mentioned may be clearly understood, through the following descriptions, by those skilled in the art to which the disclosure belongs.

Advantageous Effects of Invention

According to various embodiments of the disclosure, a bandwidth-based wireless communication system operation method and device may be provided.

In addition, according to various embodiments of the disclosure, a synchronization method for operating a wireless communication system in a narrower bandwidth, and a method and a device for configuring a parameter to support a narrower bandwidth and performing communication by using the same may be provided.

MODE FOR THE INVENTION

Figure 1:
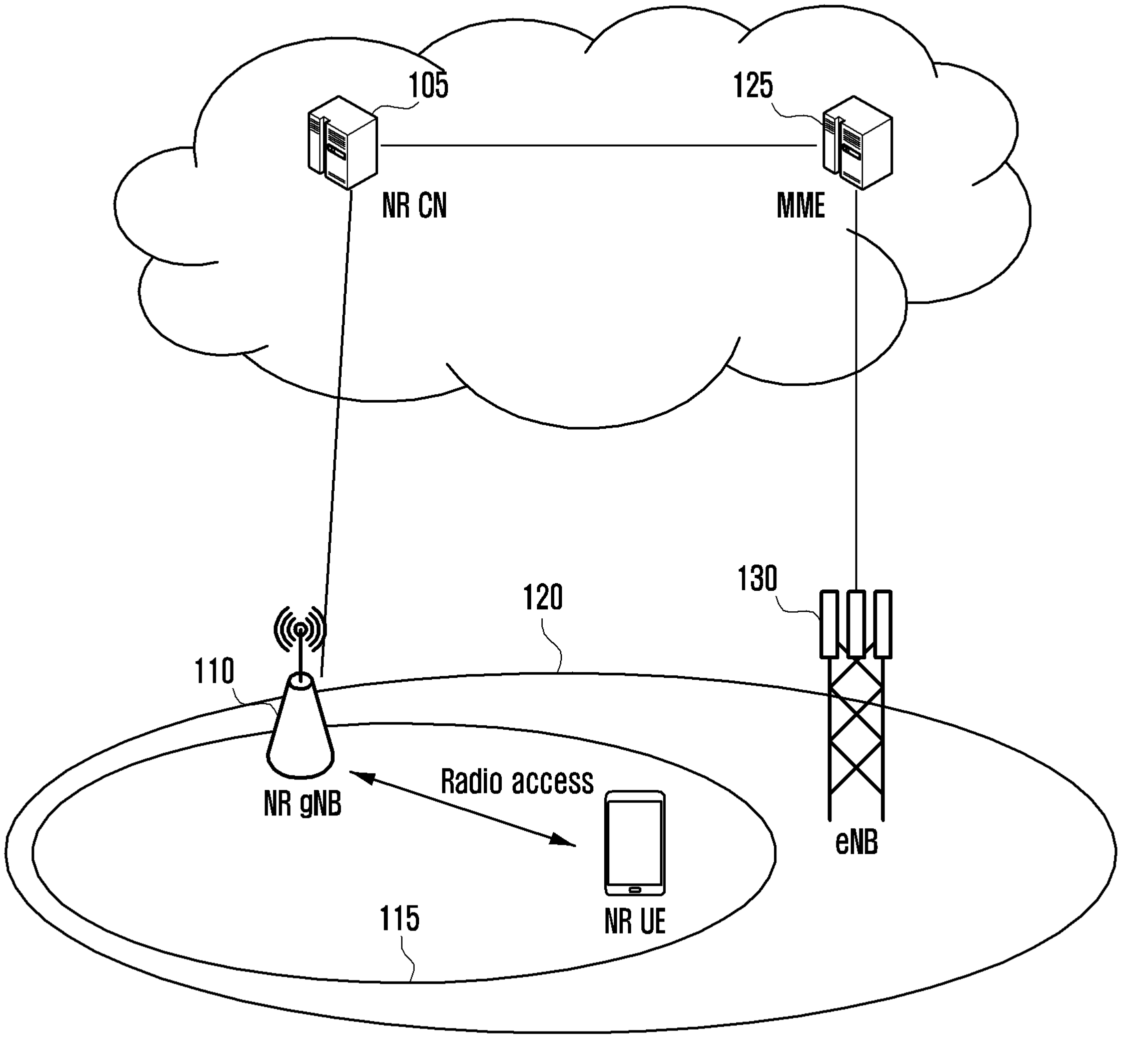
FIG. 1 is a diagram illustrating a structure of a next-generation mobile communication system according to an embodiment of the disclosure.

Hereinafter, embodiments of the disclosure will be described in detail with reference to the accompanying drawings. It should be noted that, in the drawings, the same or like elements are designated by the same or like reference signs as much as possible. Furthermore, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in the embodiments of the disclosure, the term “unit” refers to a software element or a hardware element, such as a Field Programmable Gate Array (FPGA) or an Application Specific Integrated Circuit (ASIC), which performs a predetermined function. However, the “unit” does not always have a meaning limited to software or hardware. The “unit” may be constructed either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the “unit” may be either combined into a smaller number of elements, or a “unit”, or divided into a larger number of elements, or a “unit”. Moreover, the elements and “units” or may be implemented to reproduce one or more CPUs within a device or a security multimedia card.

In the following description, a base station is an entity that allocates resources to terminals, and may be at least one of a Node B, a base station (BS), an eNode B (eNB), a gNode B (gNB), a wireless access unit, a base station controller, and a node on a network. A terminal may include a user equipment (UE), a mobile station (MS), a cellular phone, a smartphone, a computer, or a multimedia system capable of performing communication functions. Furthermore, the embodiments of the disclosure as described below may also be applied to other communication systems having similar technical backgrounds or channel types to the embodiments of the disclosure. Examples of such communication systems may include 5th generation mobile communication technologies (5G, new radio, and NR) developed beyond LTE-A, and in the following description, the “5G” may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description of the disclosure, some of terms and names defined in the 3rd generation partnership project long term evolution (3GPP LTE) standards and/or 3GPP new radio (NR) standards will be used for the sake of descriptive convenience. However, the disclosure is not limited by these terms and names, and may be applied in the same way to systems that conform other standards.

FIG. 1 is a diagram illustrating a structure of a next-generation mobile communication system according to an embodiment of the disclosure.

Referring to FIG. 1, a radio access network of a next-generation mobile communication system (hereinafter, hereinafter, referred to as NR or 5 g) may include a next-generation base station (new radio node B, hereinafter, referred to as an NR gNB or an NR base station) 110 and a next-generation radio core network (new radio core network, NR CN) 105. A next-generation radio user terminal (new radio user equipment, an NR UE or a terminal) 115 may access an external network via the NR gNB 110 and the NR CN 105.

In FIG. 1, the NR gNB 110 may correspond to an evolved node B (eNB) of the existing LTE system. The NR gNB is connected to the NR UE 115 via a radio channel, and may provide a service superior to that of the existing node B. In the next-generation mobile communication system, all user traffic may be serviced via a shared channel. Therefore, a device for performing scheduling by collecting status information such as a buffer status, an available transmission power status, and a channel status of UEs may be required, and the NR gNB 110 may be in charge of the scheduling. One NR gNB may control multiple cells. In the next-generation mobile communication system, a bandwidth equal to or greater than a current maximum bandwidth may be applied in order to implement high-speed data transmission compared to the current LTE. In addition, a beamforming technology may be additionally applied using orthogonal frequency division multiplexing (OFDM) as a radio access technology. In addition, an adaptive modulation and coding (hereinafter, referred to as AMC) scheme for determining a modulation scheme and a channel coding rate according to a channel status of a terminal may be applied.

The NR CN 105 may perform functions such as mobility support, bearer configuration, and QoS configuration. The NR CN is a device responsible for various control functions as well as a mobility management function for a terminal, and may be connected to multiple base stations. In addition, the next-generation mobile communication system may be linked with the existing LTE system, and the NR CN may be connected to an MME 125 via a network interface. The MME may be connected to an eNB 130, which is the existing base station.

Figure 2:
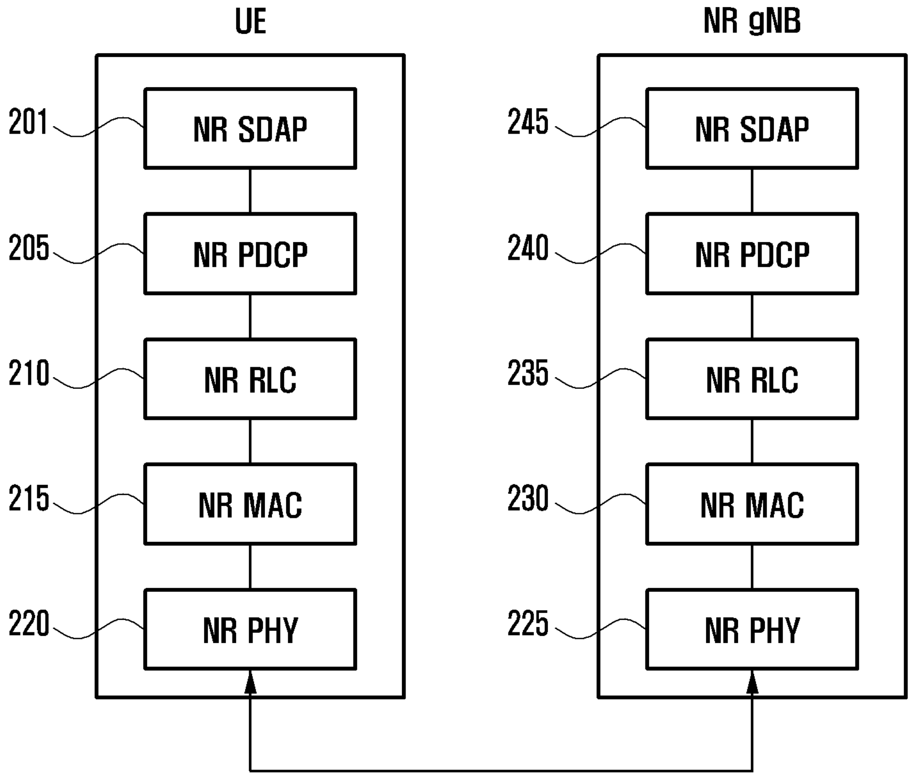
FIG. 2 is a diagram illustrating a radio protocol structure of a next-generation mobile communication system according to an embodiment of the disclosure.

FIG. 2 is a diagram illustrating a radio protocol structure of a next-generation mobile communication system according to an embodiment of the disclosure.

Referring to FIG. 2, a radio protocol of a next-generation mobile communication system may include NR service data adaptation protocols (SDAPs) 201 and 245, packet data convergence protocols (NR PDCPs) 205 and 240, NR RLCs 210 and 235, medium access controls (NR MACs) 215 and 230, and NR physical (PHY) 220 and 225 in a terminal and an NR base station, respectively.

The main functions of the NR SDAPs 201 and 245 may include some of the following functions.

- User data transfer function (transfer of user plane data)
- Mapping function of a QoS flow and a data bearer for an uplink and a downlink (mapping between a QoS flow and a DRB for both DL and UL)
- Function of marking a QoS flow ID for an uplink and a downlink (marking QoS flow ID in both DL and UL packets)
- Function of mapping a reflective QoS flow to a data bearer for uplink SDAP PDUs (reflective QoS flow to DRB mapping for the UL SDAP PDUs).

With regard to an SDAP layer device, the terminal may receive a configuration of information on whether to use a header of the SDAP layer device or whether to use a function of the SDAP layer device for each PDCP layer device, for each bearer, or for each logical channel through a radio resource control (RRC) message. When an SDAP header is configured, a 1-bit non-access stratum (NAS) quality of service (QOS) reflective configuration indicator (NAS reflective QoS) and a 1-bit access stratum (AS) QoS reflective configuration indicator (AS reflective QoS) of the SDAP header may indicate the terminal to update or reconfigure mapping information relating to a QoS flow and a data bearer for an uplink and a downlink. The SDAP header may include QoS flow ID information indicating QoS. The QoS information may be used as data processing priority, scheduling information, or the like to support a seamless service.

The main functions of the NR PDCPs 205 and 240 may include some of the following functions.

- Header compression and decompression function (Header compression and decompression: ROHC only)
- User data transmission function (Transfer of user data)
- In-sequence delivery function (In-sequence delivery of upper layer PDUs)
- Out-of-sequence delivery function (Out-of-sequence delivery of upper layer PDUs)
- Sequence reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink.)

In the above description, the sequence reordering function of the NR PDCP device may refer to a function of sequentially reordering PDCP PDUs, received from a lower layer, based on a PDCP sequence number (SN). The sequence reordering function of the NR PDCP device may include a function of delivering data to an upper layer in a reordered sequence, a function of immediately delivering data without considering the sequence, a function of recording lost PDCP PDUs by reordering the sequence, a function of reporting a state of the lost PDCP PDUs to a transmission side, and a function of requesting retransmission of the lost PDCP PDUs.

The main functions of the NR RLCs 210 and 235 may include some of the following functions.

- Data transmission function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error Correction through ARQ)
- Concatenation, segmentation, and reassembly functions (Concatenation, segmentation and reassembly of RLC SDUs)
- Re-segmentation function (Re-segmentation of RLC data PDUs)
- Sequence reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In the above description, the in-sequence delivery function of the NR RLC device may refer to a function of sequentially delivering RLC SDUs received from a lower layer to an upper layer. The in-sequence delivery function of the NR RLC device may include a function of, when an original RLC SDU is segmented into several RLC SDUs and received, reassembling and delivering the received RLC SDUs.

The in-sequence delivery function of the NR RLC device may include a function of reassembling the received RLC PUDs, based on an RLC sequence number (SN) or a PDCP SN, a function of recording lost RLC PDUs by reordering the sequence, a function of reporting a state of the lost RLC PDUs to a transmission side, and a function of requesting retransmission of the lost RLC PDUs.

The in-sequence delivery function of the NR RLC devices 210 and 235 may include a function of, when there is a lost RLC SDU, sequentially delivering only RLC SDUs prior to the lost RLC SDU to an upper layer. In addition, the in-sequence delivery function of the NR RLC device may include a function of, when a predetermined timer has expired even when there is a lost RLC SDU, sequentially delivering all RLC SDUs received before the timer starts to an upper layer. In addition, the in-sequence delivery function of the NR RLC device may include a function of, when a predetermined timer has expired even when there is a lost RLC SDU, sequentially delivering all RLC SDUs received up to now to an upper layer.

The NR RLC devices 210 and 235 may process RLC PDUs in the order of reception and deliver the processed RLC PDUs to the NR PDCP devices 205 and 240 regardless of the order of sequence numbers (out of sequence delivery).

In the case of receiving a segment, the NR RLC devices 210 and 235 may receive segments stored in a buffer or to be received later, reconfigure the segments into one complete RLC PDU, and deliver the reconfigured RLC PDU to the NR PDCP device.

An NR RLC layer may not include a concatenation function, and may perform the function in an NR MAC layer or replace the function with a multiplexing function of the NR MAC layer.

In the above description, the out-of-sequence delivery function of the NR RLC device may refer to a function of directly delivering RLC SDUs received from a lower layer to an upper layer regardless of the sequence. The out-of-sequence delivery function of the NR RLC device may include a function of, when an original RLC SDU is segmented into several RLC SDUs and received, reassembling and delivering the received RLC SDUs. The out-of-sequence delivery function of the NR RLC device may include a function of storing RLC SNs or PDCP SNs of received RLC PDUs and reordering the sequence to record lost RLC PDUs.

The NR MACs 215 and 230 may be connected to multiple NR RLC layer devices configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ (hybrid automatic repeat request))
- Priority handling function between logical channels (Priority handling between logical channels of one UE)
- Priority handling function between UEs (Priority handling between UEs by means of dynamic scheduling)
- MBMS service identification function (MBMS service identification)
- Transmission format selection function (Transport format selection)
- Padding function (Padding)

The NR PHY layers 220 and 225 may perform an operation of channel-coding and modulating upper layer data into OFDM symbols to transmit the OFDM symbols through a radio channel, or an operation of demodulating and channel-decoding OFDM symbols received through a radio channel to deliver the demodulated and channel-decoded OFDM symbols to an upper layer.

Hereinafter, a frame structure of a 5G system will be described in more detail with reference to the drawings.

Figure 3:
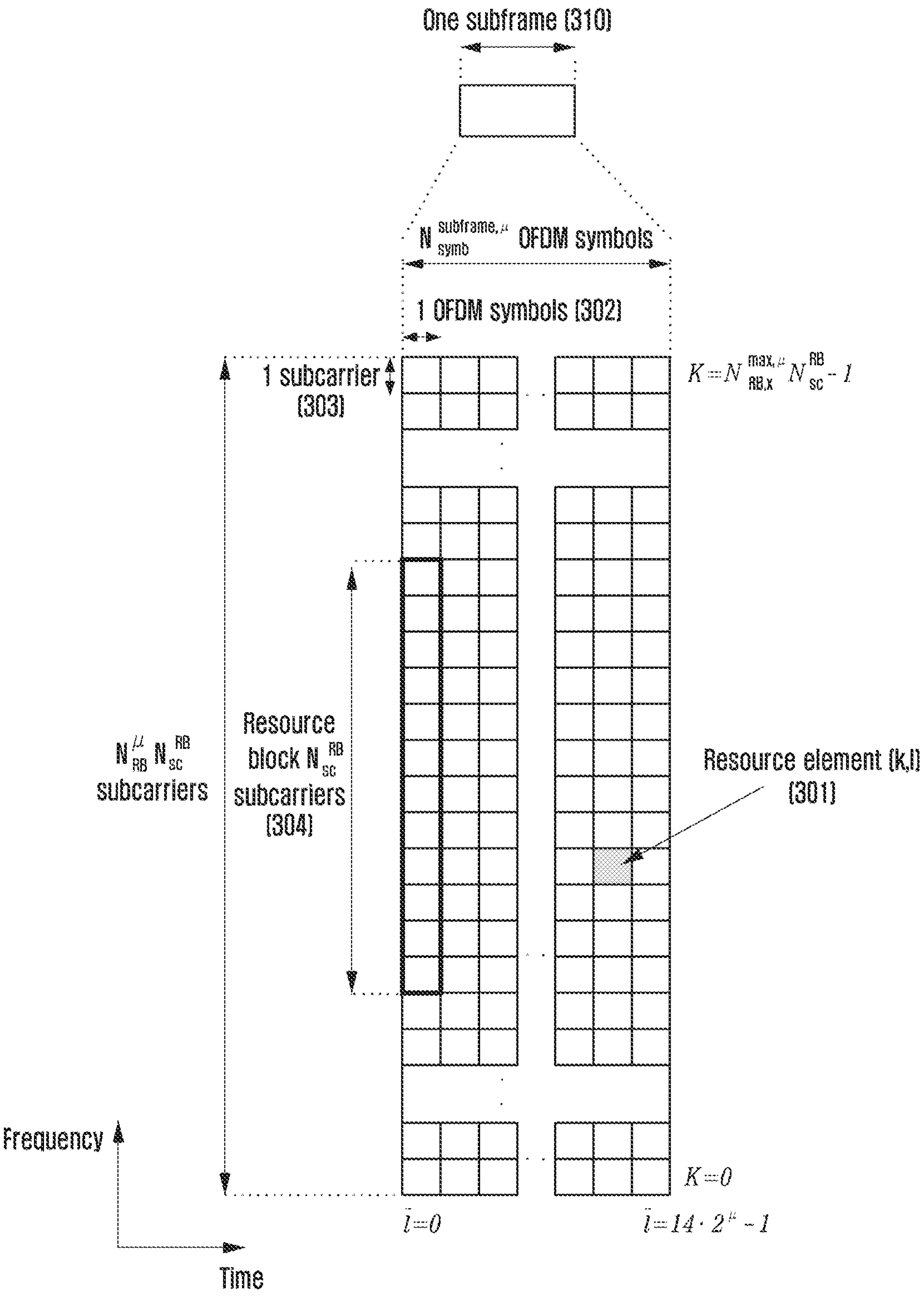
FIG. 3 is a diagram illustrating a basic structure of a time-frequency domain, which is a radio resource area in which data or a control channel is transmitted in a 5G communication system, according to an embodiment of the disclosure.

FIG. 3 is a diagram illustrating a basic structure of a time-frequency domain, which is a radio resource area in which data or a control channel is transmitted in a 5G system.

In FIG. 3, a horizontal axis represents a time domain, and a vertical axis represents a frequency domain. The basic unit of resources in time and frequency domains is a resource element (RE) 301, and may be defined as 1 orthogonal frequency division multiplexing (OFDM) symbol 302 on a time axis and 1 subcarrier 303 on a frequency axis. In the frequency domain, $$N_{SC}^{RB}$$

(for example, 12) continuous REs may configure one resource block (RB) 304.

Figure 4:
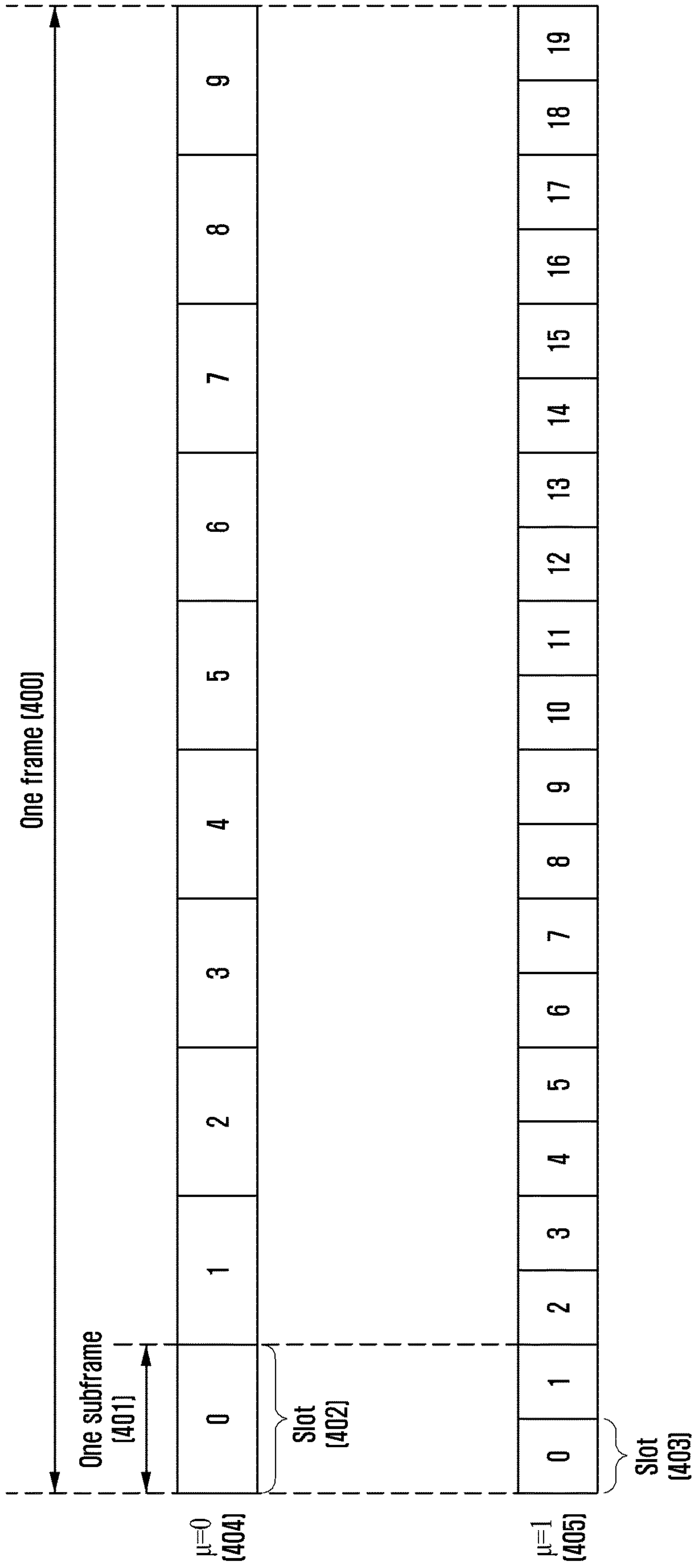
FIG. 4 is a diagram illustrating an example of a slot structure considered in a 5G system according to an embodiment of the disclosure.

FIG. 4 is a diagram illustrating an example of a slot structure considered in a 5G system.

FIG. 4 illustrates an example of structures of a frame 400, a subframe 401, and a slot 402. One frame 400 may be defined as 10 ms. One subframe 401 may be defined as 1 ms, and therefore, the one frame 400 may be configured by a total of 10 subframes 401. One slot 402 or 403 may be defined to have 14 OFDM symbols (that is, the number of symbols per 1 slot $$(N_{symb}^{slot}) = 14).$$

The one subframe 401 may be configured by one or a plurality of slots 402 and 403, and the number of slot 402 or 403 per 1 subframe 401 may vary depending on a configuration value u 404 or 405 for a subcarrier spacing. In an example of FIG. 4, as a subcarrier spacing configuration value, a case where μ-0 404 and a case where μ=1 405 are shown. In the case where μ-0 404, the one subframe 401 may be configured by one slot 402, and in the case where μ=1 405, the one subframe 401 may be configured by two slots 403. That is, the number of slots per 1 subframe $$(N_{slot}^{subframe,\mu})$$

may vary depending on the configuration value μ for the subcarrier spacing, and accordingly, the number of slots per 1 frame $$(N_{slot}^{frame,\mu})$$

may vary.

$$N_{slot}^{subframe,\mu} \text{ and } N_{slot}^{frame,\mu}$$

depending on each subcarrier spacing configuration u may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in the 5G communication system will be described in detail with reference to FIG. 5.

Figure 5:
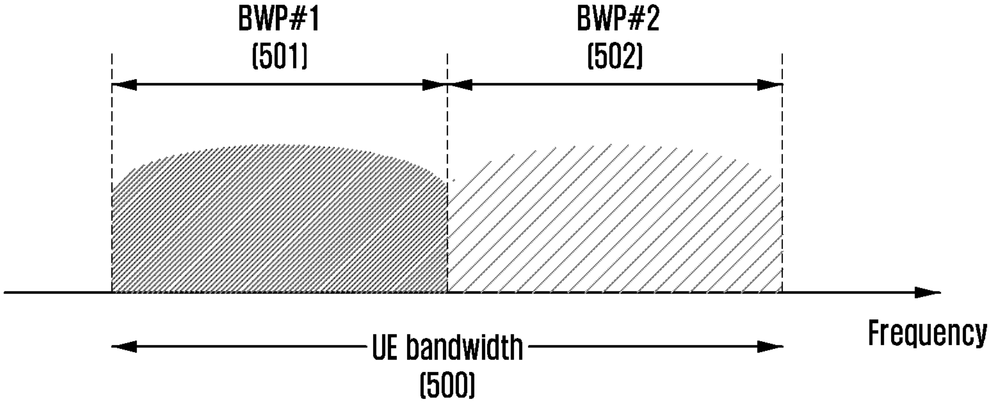
FIG. 5 is a diagram illustrating an example of a configuration for a bandwidth part in a 5G communication system according to an embodiment of the disclosure.

FIG. 5 is a diagram illustrating an example of a configuration for a bandwidth part in a 5G communication system.

FIG. 5 illustrates an example in which a UE bandwidth 500 is configured to be two bandwidth parts, that is, bandwidth part #1 (BWP #1) 501 and bandwidth part #2 (BWP #2) 502. A base station may configure one or multiple bandwidth parts to a terminal, and may configure information for each bandwidth part, for example, as shown in Table 2 below. The BWP below may be referred to as BWP configuration information.

TABLE 2

```
BWP ::=                     SEQUENCE {
   Bwp-Id                      BWP-Id,
   locationAndBandwidth        INTEGER (0..65536),
   subcarrierSpacing           ENUMERATED {n0, n1, n2, n3, n4, n5},
   cyclicPrefix              ENUMERATED { extended }
OPTIONAL   -- Need R
}
```

The disclosure is not limited to the above example, and in addition to the above configuration information, various parameters related to a bandwidth part may be configured for the terminal. The information may be delivered from the base station to the terminal through upper layer signaling, for example, RRC signaling. Among the one or multiple configured bandwidth parts, at least one bandwidth part may be activated. Whether to activate the configured bandwidth part may be semi-statically delivered from the base station to the terminal through RRC signaling or dynamically delivered through downlink control information (DCI).

According to some embodiments, the terminal before RRC connection may receive a configuration of an initial bandwidth part (initial BWP) for initial access from the base station through a master information block (MIB). To be more specific, the terminal may receive configuration information on a search space and a control resource set (CORESET) through which a PDCCH for receiving system information (may correspond to remaining system information; RMSI or system Information block 1; SIB1) required for initial access can be transmitted, through the MIB in an initial access stage. The control resource set and search space configured through the MIB may each be considered as identifier (ID) 0. The base station may notify the terminal of configuration information such as frequency allocation information, time allocation information, and numerology for control resource set #0 through the MIB. In addition, the base station may notify the terminal of configuration information on a monitoring period and an occasion for control resource set #0, that is, configuration information on search space #0, through the MIB. The terminal may regard a frequency domain configured as control resource set #0 obtained from the MIB as the initial bandwidth part for initial access. In this case, an identifier (ID) of the initial bandwidth part may be regarded as 0.

MIB information refers to an example of Table 3 below. The terminal may identify control resource set #0 (CORESET #0) through which a PDCCH for scheduling a PDSCH through which a system information block (SIB1) is transmitted can be transmitted, through a value of a PDCCH-ConfigSIB1 parameter included in the received MIB.

TABLE 3

```
MIB ::=                          SEQUENCE {
   systemFrameNumber                BIT STRING (SIZE (6)),
   subCarrierSpacingCommon          ENUMERATED (scs15or60, scs30or120),
   ssb-SubcarrierOffset             INTEGER (0..15),
   dars-TypeA-Position              ENUMERATED (pos2, pos3),
   pdcch-ConfigSIB1                 PDCCH-ConfigSIB1,
   cellBarred                       ENUMERATED (barred, notBarred),
   intraFreqReselection             ENUMERATED (allowed, notAllowed),
   spare                            BIT STRING (SIZE (1))
}
```

The configuration for the bandwidth supported by 5G may be used for various purposes.

According to some embodiments, when a bandwidth supported by the terminal is narrower than a system bandwidth, this may be supported through the bandwidth part configuration. For example, the base station configures a frequency location (configuration information 2) of a bandwidth part to the terminal, and thus the terminal may transmit or receive data at a specific frequency location within the system bandwidth.

In addition, according to some embodiments, the base station may configure a plurality of bandwidth parts to the terminal for the purpose of supporting different numerologies. For example, in order to support both data transmission and reception using a subcarrier spacing of 15 kHz and a subcarrier spacing of 30 kHz for a certain terminal, two bandwidth parts may be configured to have subcarrier spacings of 15 kHz and 30 kHz, respectively. Different bandwidth parts may be frequency division multiplexed, and when data is to be transmitted or received at a specific subcarrier spacing, a bandwidth part configured to have the corresponding subcarrier spacing may be activated.

In addition, according to some embodiments, for the purpose of reducing power consumption of the terminal, the base station may configure bandwidth parts having different sizes of bandwidths to the terminal. For example, when the terminal supports a very large bandwidth, for example, a bandwidth of 100 MHz, and always transmits or receives data through the corresponding bandwidth, very large power consumption may occur. In particular, monitoring of an unnecessary downlink control channel at a large bandwidth of 100 MHz in a situation where there is no traffic may be very inefficient in terms of power consumption. For the purpose of reducing power consumption of the terminal, the base station may configure a relatively narrow bandwidth part, for example, a bandwidth part of 20 MHz to the terminal. In a situation where there is no traffic, the terminal may perform a monitoring operation in a 20 MHz bandwidth, and when data is generated, transmit or receive the data in a bandwidth part of 100 MHz according to an instruction of the base station.

In a method of configuring a bandwidth part, terminals before RRC connection may receive configuration information on an initial bandwidth part through an MIB in the initial access stage. To be more specific, the terminal may receive a configuration of a control resource set (CORESET) for a downlink control channel through which DCI which schedules an SIB can be transmitted from an MIB of a physical broadcast channel (PBCH). A bandwidth of the control resource set configured by the MIB may be considered as the initial bandwidth part, and the terminal may receive the PDSCH through which the SIB is transmitted through the configured initial bandwidth part. In addition to receiving an SIB, the initial bandwidth part may be used for other system information (OSI), paging, and random access.

Figure 6:
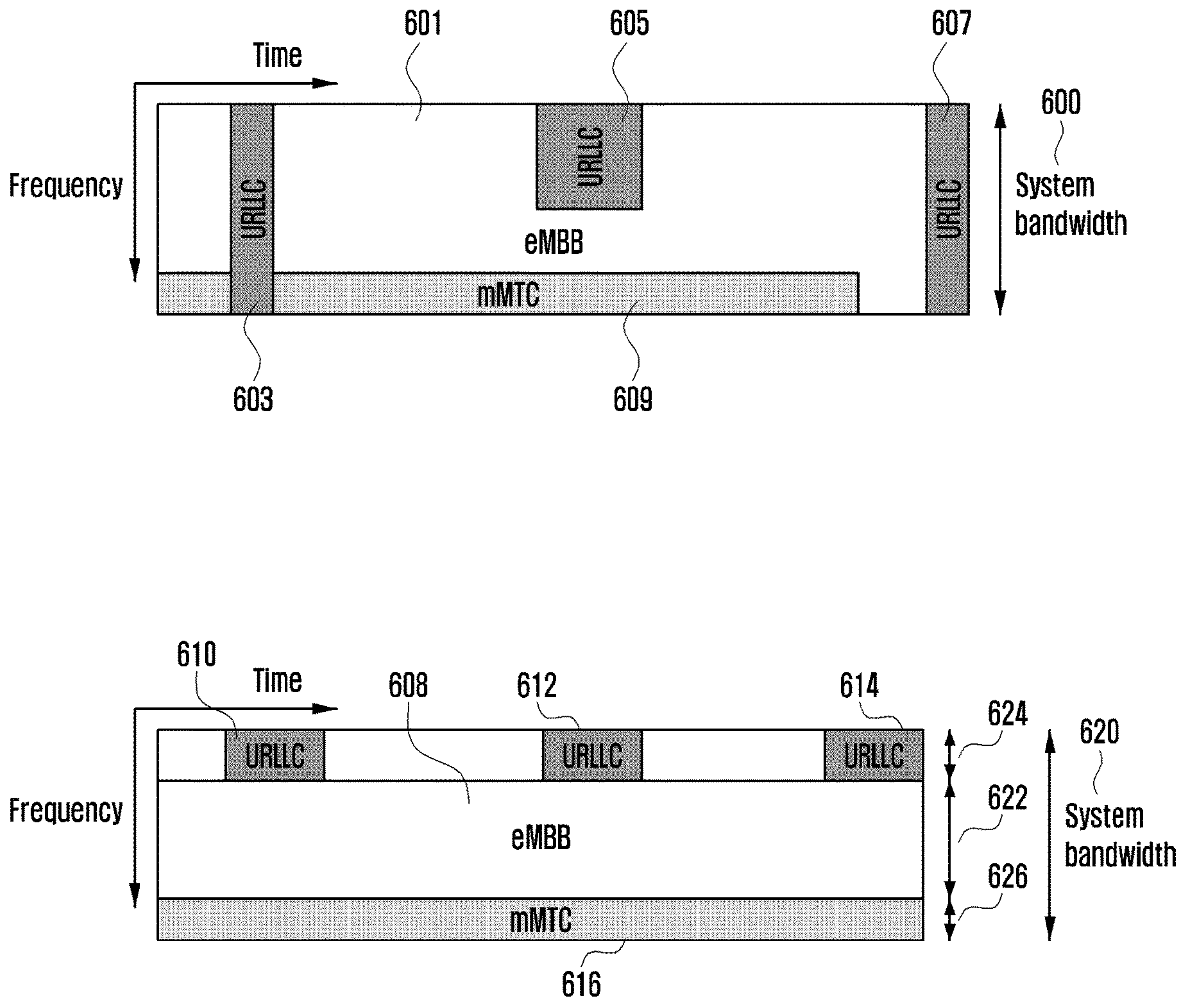
FIG. 6 is a diagram illustrating an example in which frequency and time resources are allocated for information transmission in an NR system according to an embodiment of the disclosure.

FIG. 6 is a diagram illustrating an example in which frequency and time resources are allocated for information transmission in an NR system according to an embodiment of the disclosure.

Referring to FIG. 6, a manner in which frequency and time resources are allocated for information transmission in each system may be identified. First, resources for data for an eMBB, URLLC, and mMTC are allocated in the entire system frequency band 600. When URLLC data 603, 605, and 607 are generated and required to be transmitted while a resource 601 allocated for an eMBB and a resource 609 allocated for an mMTC are allocated and transmitted in a specific frequency band, the URLLC data 603, 605, and 607 may be transmitted without emptying or transmitting the part to which the resource 601 allocated for the eMBB and the resource 609 allocated for the mMTC are already allocated. Among the above services, URLLC requires reduction of latency, and thus the URLLC data 603, 605, and 607 may be allocated to and transmitted through a part of the resource 601 allocated for the eMBB. When URLLC is additionally allocated and transmitted in the resource 601 allocated for the eMBB, eMBB data may not be transmitted in overlapping frequency-time resources, and thus the transmission performance of the eMBB data may be lowered. That is, in the above case, eMBB data transmission failure may occur due to URLLC allocation.

In addition, an entire system frequency band 620 may be divided and used to transmit a service and data in each subband 622, 624, and 626. Information related to the subband configuration may be determined in advance, and the information may be transmitted from the base station to the terminal through upper signaling. Alternatively, the base station or a network node may randomly divide the information related to the subband and provide services to the terminal without transmitting separate subband configuration information. The state is shown in which the subband 622 is used for eMBB data transmission 608, the subband 624 is used for URLLC data transmission 610, 612, and 614, and the subband 626 is used for mMTC data transmission 616.

Throughout the embodiment, the length of a transmission time interval (TTI) used for URLLC transmission may be shorter than the length of a TTI used for eMBB or mMTC transmission. In addition, a response to information related to the URLLC may be transmitted faster than that related to the eMBB or mMTC, and thus the information may be transmitted or received with low delay. A structure of a physical layer channel used for each type to transmit the above three types of services or data may be different. For example, at least one of the length of a transmission time interval (TTI), the allocation unit of a frequency resource, a structure of a control channel, and a data mapping method may be different.

Figure 7:
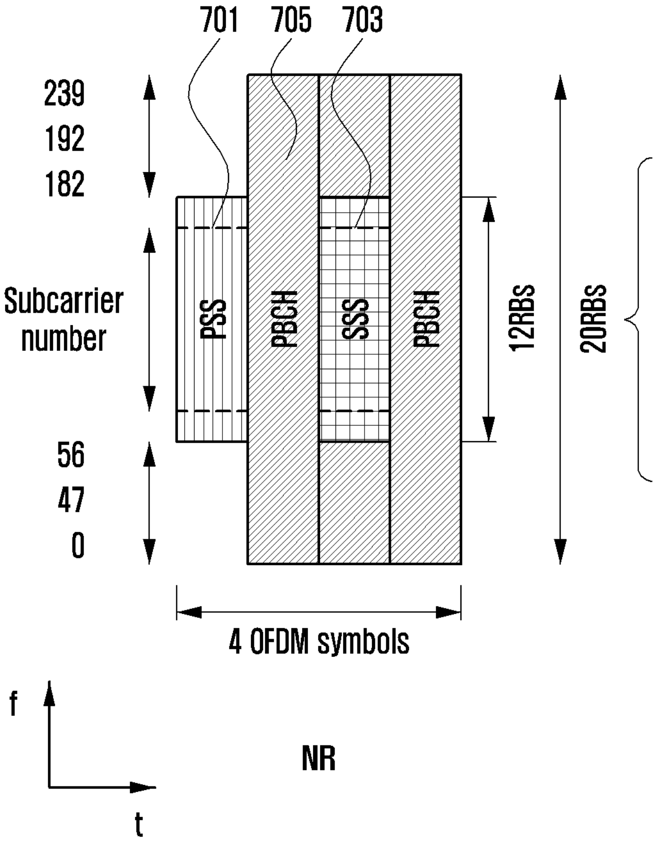
FIG. 7 is a diagram illustrating a state in which a physical broadcast channel and a synchronization signal of an NR system are mapped in frequency and time domains, according to an embodiment of the disclosure.

In the above, three types of services and three types of data have been described, but there may be more types of services and data corresponding thereto, and the content of the disclosure may be applied in this case as well. FIG. 7 is a diagram illustrating a state in which a physical broadcast channel and a synchronization signal of an NR system are mapped in frequency and time domains, according to an embodiment of the disclosure.

The 5G communication system provides a synchronization signal block (SSB) for synchronization (time/frequency) of a terminal. The one SSB may be configured by a primary synchronization signal (PSS) 701, a secondary synchronization signal (SSS) 703, and a physical broadcast channel (PBCH) 705. A base station supporting the 5G communication system may transmit at least one SSB. A terminal supporting the 5G communication system may receive at least one SSB and perform synchronization with the base station. The SSB configured by the PSS 701, the SSS 703, and the PBCH 705 is mapped over 4 OFDM symbols on the time axis. The PSS 701 and the SSS 703 are mapped to 12 RBs on the frequency axis, and the PBCH 705 is mapped to 20 RBs on the frequency axis. Since one RB includes 12 subcarriers, when a subcarrier spacing (SCS) changes, the size of the RB changes, and when the size of the RB changes, the size of a frequency band occupied by 12 RBs and 20 RBs may change. The table in FIG. 7 shows how a frequency band of 20 RBs (a frequency band size of an SSB) changes depending on a subcarrier spacing. When an SCS is 15 kHz, a frequency band of one SSB has a bandwidth of 15 kHz*12*20=3.6 MHz, and when the SCS is 30 kHz, one SSB has a bandwidth of 30 kHz*12*20=7.2 MHz. A resource area where the PSS 701, the SSS 703, and the PBCH 705 are transmitted may be called an SS/PBCH block. In addition, the SS/PBCH block may be referred to as an SSB block.

The terminal may obtain information (e.g., PDCCH-ConfigSIB1) for a PDCCH to receive system information (e.g., SIB1) required for initial access through an MIB of a PBCH. The PDCCH-COnfigSIB1 may include configuration information on a search space and a control resource set (CORESET) through which a PDCCH can be transmitted. The control resource set and search space configured through the MIB may be considered as CORESET #0 and search space #0, respectively. The base station may notify the terminal of configuration information for control resource set #0 such as frequency allocation information (e.g., the number of RBs), time allocation information (e.g., the number of symbols), numerology, an index of a common RB which overlaps with the first RB of the SSB, and an offset between the smallest RBs of CORESET #0 through the MIB. In addition, the base station may notify the terminal of configuration information on a monitoring period and an occasion for control resource set #0, that is, configuration information on search space #0, through the MIB.

According to the current standard, the minimum number of RBs which can be configured to be CORESET #0 is 24, and the minimum configurable subcarrier spacing is 15 kHz. Therefore, when 15 kHz is used as the subcarrier spacing, the minimum bandwidth of CORESET #0 may have 4.32 MHz (15 kHz*12*25).

In consideration of the minimum bandwidth (3.6 MHz) of the SSB and the minimum bandwidth (4.32 MHz) of CORESET #0 described above, there is a problem in that a bandwidth (e.g., 3 MHz to 4 MHz, but the bandwidth is not limited thereto and may be a bandwidth lower than 3 MHz) lower than 4.32 MHz cannot be operated since the bandwidth is lower than the minimum bandwidth of the SSB or CORESET #0. Therefore, a solution is required to operate a service in a narrow bandwidth since networks currently being operated in a narrow bandwidth in a system such as LTE cannot be upgraded to an NR network.

In various embodiments of the disclosure, a subcarrier spacing lower than 15 kHz is newly defined, and when the subcarrier spacing is defined, a method of changing and configuring various parameters according to changes in a design of an SSB and a subcarrier spacing is provided.

In various embodiments of the disclosure, new subcarrier spacing supported by the mobile communication system may be added. The new subcarrier spacing may be a subcarrier spacing lower than 15 kHz, for example, 7.5 kHz ($\mu=-1$), 3.75 kHz ($\mu=-2$), etc. For convenience of description, the following description is based on the subcarrier spacing of 7.5 kHz, but various embodiments of the disclosure can also be applied to various subcarrier spacings lower than 7.5 kHz.

Figure 8:
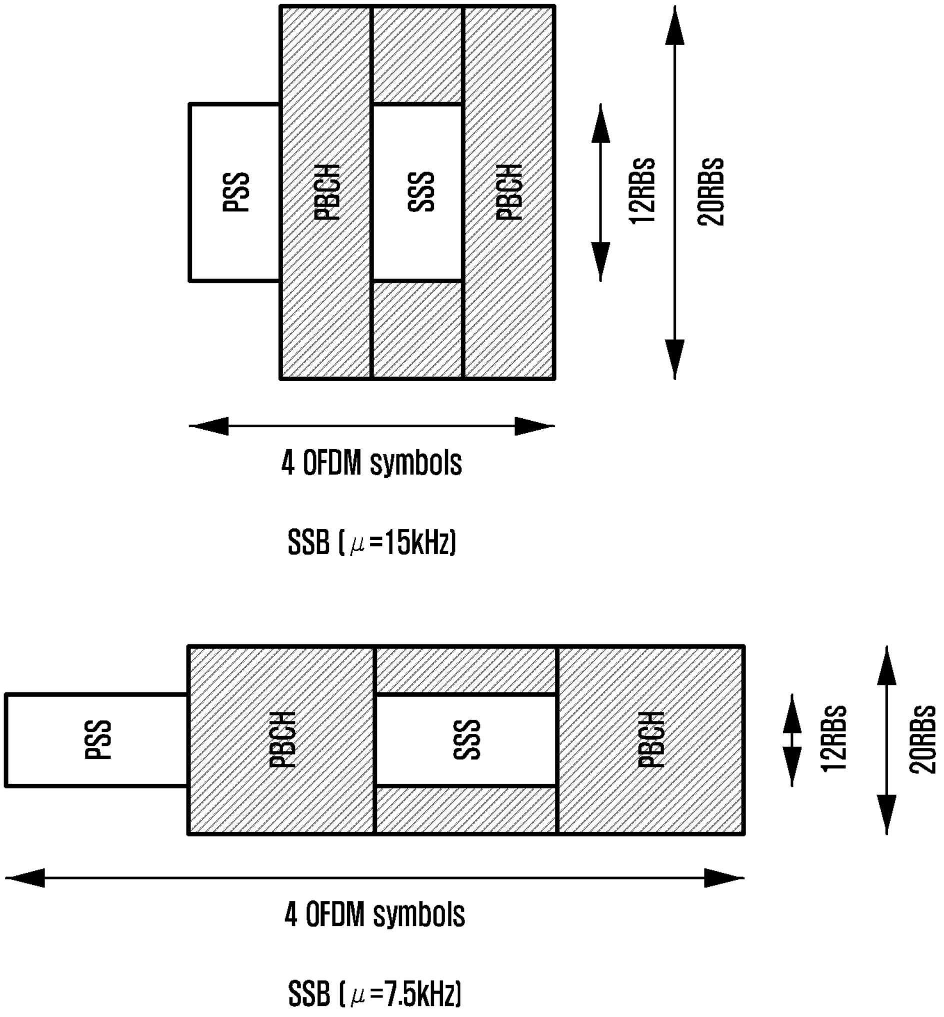
FIG. 8 is a diagram illustrating an SSB configuration according to a subcarrier spacing according to an embodiment of the disclosure.

FIG. 8 is a diagram illustrating an SSB configuration according to a subcarrier spacing according to an embodiment of the disclosure.

The general configuration and content of an SSB are described with reference to the description of FIG. 7. Referring to FIG. 8, it may be noted that the size of a bandwidth of an SSB and the size of a symbol change when a subcarrier spacing is 15 kHz and when a subcarrier spacing is 7.5 kHz. That is, it may be noted that the number of RBs (20) which configure an SSB and the number of OFDM symbols (4) are the same, but since the spacing of subcarriers and the size of an OFDM symbol change, the size of the frequency axis of the SSB and the size of the time axis of the SSB change. Specifically, when the subcarrier spacing is reduced from 15 kHz to 7.5 kHz, the size of the frequency axis of the SSB is reduced by ½, and the size of the time axis of the SSB becomes twice as long.

The base station according to an embodiment of the disclosure may generate and transmit a channel and a signal with u (subcarrier spacing) of 7.5 kHz. For example, the base station may generate a subcarrier spacing of a subcarrier used for transmission of each signal and channel included in an SSB (PSS, SSS, and PBCH) by configuring the same to be 7.5 kHz, and transmit the same. Accordingly, a bandwidth of the SSB may be 7.5 kHz*12*20=1.8 MHz.

According to an embodiment of the disclosure, a subcarrier spacing for CORESET #0 may be configured according to a subcarrier spacing of the SSB. The base station may configure the subcarrier spacing of CORESET #0 to correspond to the subcarrier spacing of the SSB (the subcarrier spacing of the SSB and the subcarrier spacing of CORESET #0 may be the same). For example, if the subcarrier spacing of the SSB is 7.5 kHz, the base station may configure a resource of CORESET #0 to be 7.5 kHz, and transmit the configuration for CORESET #0 to the terminal. In addition, the base station may configure a subcarrier spacing of a subcarrier to which a PDCCH transmitted through CORESET #0 is mapped to be 7.5 kHz, generate control information, and transmit the information through the PDCCH. When the subcarrier spacing of 7.5 kHz is applied, the minimum bandwidth of CORESET #0 may be 7.5 kHz*12*24=2.16 MHz. Information on the subcarrier spacing for CORESET #0 may be included in an MIB or PDCCH-ConfigSIB1 of the MIB, and transmitted. For example, the information on the subcarrier spacing may include at least one piece of information such as whether the subcarrier spacing of the SSB and the subcarrier spacing of CORESET #0 are the same (for example, indicating whether the subcarrier spacings are the same by using 1-bit information), and a multiple relationship (indicating multiple relationships such as ½, 1, 2, 4 times, etc. by using n-bit information).

The base station according to an embodiment of the disclosure may identify and obtain a frequency bandwidth of a frequency band to be operated by the base station. When the frequency bandwidth is less than or equal to a specific threshold or less than the specific threshold, the base station may generate and transmit a channel and a signal by using a subcarrier spacing (e.g., 7.5 kHz) lower than 15 kHz. In addition, the base station according to an embodiment of the disclosure may identify the frequency band to be operated by the base station. When the identified frequency band is a specific frequency band (e.g., band 8) or lower than or equal to a preconfigured bandwidth (e.g., a band for supporting a bandwidth lower than or equal to 5 MHz), the base station may generate and transmit a channel and a signal by using a subcarrier spacing lower than 15 kHz. For example, the base station may generate an SSB, based on the determined subcarrier spacing, and generate a configuration for CORESET #0.

The terminal according to an embodiment of the disclosure may receive and process a channel and a signal transmitted using u (subcarrier spacing) of 7.5 kHz. For example, the terminal may receive and process a channel and a signal under the assumption that a subcarrier spacing of a subcarrier used for transmission of each signal and channel included in an SSB (PSS, SSS, and PBCH) is 7.5 kHz. The terminal may determine a subcarrier spacing assumed for reception and processing of the SSB (PSS, SSS, and PBCH) depending on an operating frequency band and/or bandwidth. For example, if a frequency band that the terminal desires to access corresponds to a specific frequency band (e.g., band 8) or a band which supports a bandwidth lower than or equal to a preconfigured bandwidth, the terminal may assume that a subcarrier spacing used in the corresponding band is 7.5 kHz, assume that a subcarrier spacing of 15 kHz or greater is used in other frequency bands, and receive and process a signal, data, etc. in the corresponding band. For example, when the frequency band corresponds to a specific frequency band (e.g., band 8) or a band which supports a bandwidth lower than or equal to a preconfigured bandwidth, the terminal may receive an SSB by assuming that the subcarrier spacing of the SSB is 7.5 kHz (the subcarrier spacing is not limited to 7.5 kHz, and a subcarrier spacing lower than 7.5 kHz may be used), and when processing of the SSB is successful, the terminal may identify and obtain a resource of CORESET #0 by assuming that a subcarrier spacing of the CORESET #0 resource is 7.5 kHz (the subcarrier spacing is not limited to 7.5 kHz, and a subcarrier spacing lower than 7.5 kHz may be used). The subcarrier spacing of CORESET #0 may follow the subcarrier spacing of the SSB, and may also be determined based on information on the subcarrier spacing for CORESET #0 included in the MIB.

Figure 9:
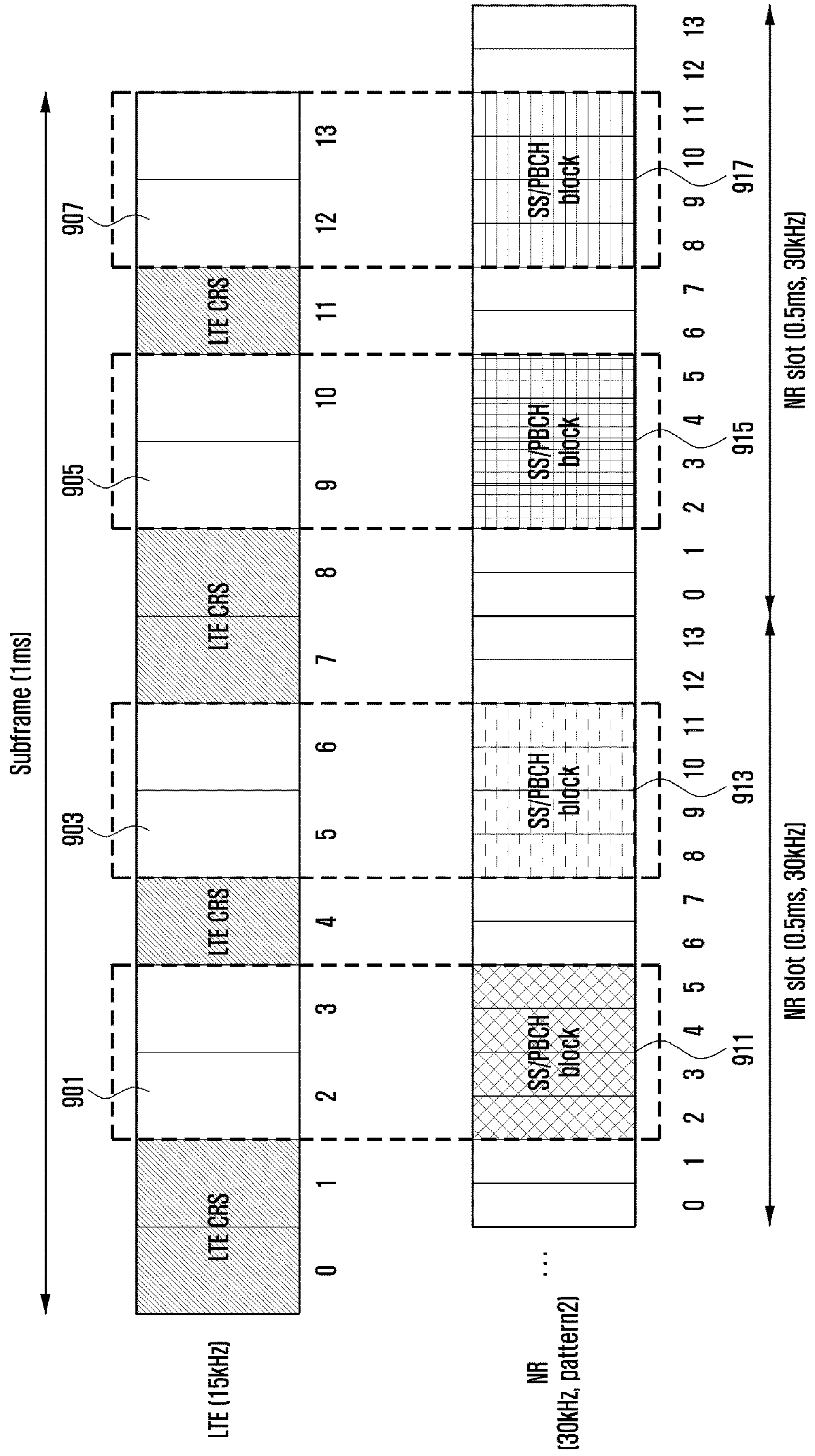
FIG. 9 is a diagram illustrating symbols to which one SS/PBCH block is mapped within a slot, according to an embodiment of the disclosure.

FIG. 9 is a diagram illustrating symbols to which one SS/PBCH block is mapped within a slot, according to an embodiment of the disclosure.

Referring to FIG. 9, an example of a conventional LTE system using a subcarrier spacing of 15 kHz and an NR system using a subcarrier spacing of 30 kHz is shown, and SS/PBCH blocks 911, 913, 915, and 917 of the NR system are designed to be transmitted at locations 901, 903, 905, and 907 where cell-specific reference signals (CRSs) always transmitted in the LTE system may be avoided. This may be to enable the LTE system and NR system to coexist in one frequency band.

Figure 10:
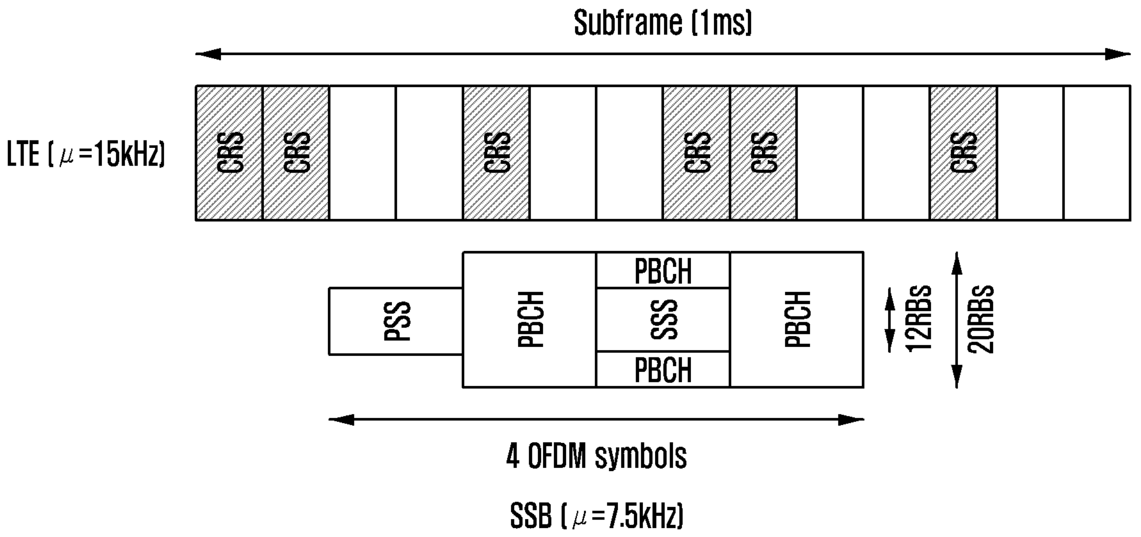
FIG. 10 is a diagram illustrating a problem which occurs due to different subcarrier spacings in different communication systems according to an embodiment of the disclosure.

FIG. 10 is a diagram illustrating a problem which occurs due to different subcarrier spacings in different communication systems according to an embodiment of the disclosure.

Referring to FIG. 10, in the case of using a subcarrier spacing of 15 kHz in LTE and the case of using a subcarrier (e.g., 7.5 kHz) lower than 15 kHz according to an embodiment of the disclosure, a problem in which an SSB and a CRS of the LTE overlap each other may be identified. CRSs transmitted in 0th, 1st, 4th, 7th, 8th, and 11th OFDM symbols of every subframe of an LTE carrier are transmitted. A CRS and an SSB do not overlap each other in the embodiment of FIG. 9, but when a small subcarrier spacing is used in the embodiment of FIG. 10, a problem in which a CRS and an SSB overlap each other in some symbols may occur.

According to an embodiment of the disclosure, in order to solve the above problem, in a symbol where the SSB and the CRS overlap each other, the SSB may not be mapped in a resource to which the CRS is mapped. The NR base station may puncture the resource to which the CRS is mapped, and map the SSB in a resource to which the CRS is not mapped. To this end, the LTE base station and the NR base station operating the corresponding band may provide each other with information on a resource through which the SSB is transmitted and a resource through which the CRS is transmitted, and this can be used to solve the problem of resource overlap.

In addition, according to an embodiment of the disclosure, in order to solve the above problem, the LTE base station may not transmit the CRS in a resource to which the SSB is mapped. Since the LTE base station does not transmit the CRS in a specific frequency band of a specific symbol, the problem in which the CRS and the SSB overlap each other can be solved. To this end, the LTE base station and the NR base station operating the corresponding band may provide each other with information on a resource through which the SSB is transmitted and a resource through which the CRS is transmitted, and this can be used to solve the problem in which an SSB resource and a CRS resource overlap each other.

In addition, in order to solve the above problem, the structure of the SSB may be partially adjusted. An embodiment of adjusting the structure of the SSB will be described with reference to FIG. 11.

Figure 11:
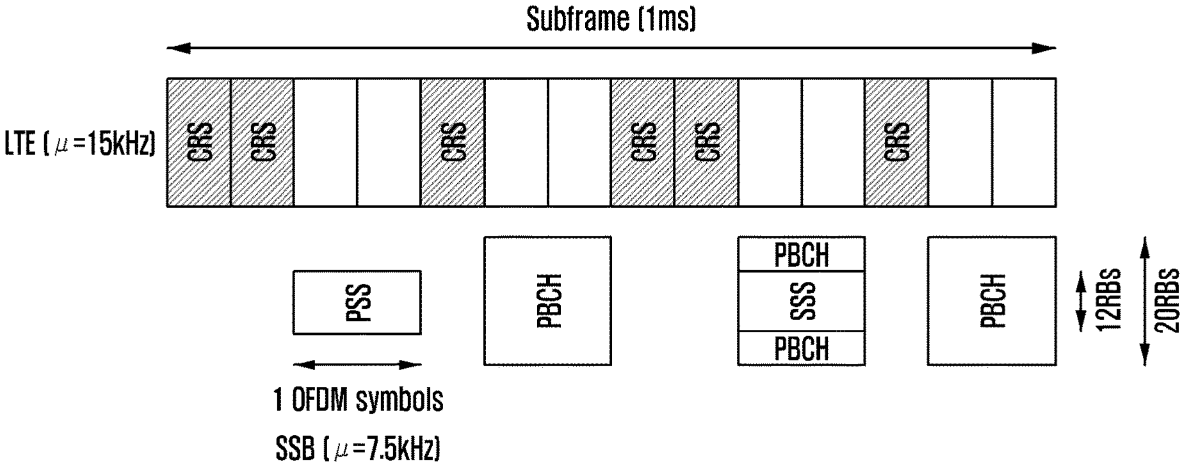
FIG. 11 is a diagram illustrating a structure of a discontinuous SSB according to an embodiment of the disclosure.

FIG. 11 is a diagram illustrating a structure of a discontinuous SSB according to an embodiment of the disclosure.

Referring to FIG. 11, a PSS, a PBCH, and an SSS of an SSB are not mapped to continuous symbols, but may be configured to be mapped to discontinuous symbols within one slot. That is, referring to the SSB structure of FIG. 7, in the NR, the SSB is basically configured by four continuous OFDM symbols. However, as described in FIG. 10, in order to solve a problem which occurs due to a change in a subcarrier spacing, the SSB may be configured to be mapped to discontinuous symbols rather than continuous symbols. In the embodiment of FIG. 11, a mapping order in an OFDM symbol has been maintained as a PSS, a PBCH, an SSS, and a PBCH, but in the case of configuring a discontinuous SSB, the structure of the SSB is not limited thereto, and the SSB may also be configured by changing a mapping order of a PSS, an SSS, and a PBCH.

Next, timing-related parameters according to various embodiments of the disclosure are defined. When a subcarrier spacing lower than 15 kHz is used according to various embodiments of the disclosure, timing-related parameters may be required to be changed to support the subcarrier spacing.

In the 5G communication system, a time required for processing of each of various channels is defined. The time required for the processing is defined for each channel depending on the terminal's capability and numerology (subcarrier spacing $\mu$).

A time ($N_2$) required for preparation of a physical uplink shared channel (PUSCH) may be defined for each the terminal's capability and numerology (subcarrier spacing $\mu$) as shown in Table 4 (the case of Table 1 PUSCH preparation time for PUSCH timing capability 1) and Table 5 (the case of Table 2 PUSCH preparation time for PUSCH timing capability 2) below.

TABLE 4

| $\mu$ | PUSCH preparation time $N_2$ [symbols] |
|---|---|
| 0 | 10 |
| 1 | 12 |
| 2 | 23 |
| 3 | 36 |

TABLE 5

| $\mu$ | PUSCH preparation time $N_2$ [symbols] |
|---|---|
| 0 | 5 |
| 1 | 5.5 |
| 2 | 11 for frequency range 1 |

Although not shown in Tables 4 and 5 above, when a subcarrier spacing lower than 15 kHz is used, an additional $N_2$ value may be used as a value lower than or equal to a preconfigured value. For example, a value lower than or equal to 15 kHz may be used. According to an embodiment of the disclosure, in the case where $\mu$=7.5 kHz ($\mu$=−1), a PUSCH preparation time ($N_2$) for PUSCH timing capability 1 may be determined as one of values included in $[N_{2,min,cap1}, 10]$, one of values included in $[N_{2,min,cap1}, 10)$, one of values included in $(N_{2,min,cap1}, 10]$, or one of values included in $(N_{2,min,cap1}, 10)$. In addition, according to an embodiment of the disclosure, in the case where $\mu$=7.5 kHz ($\mu$=−1), a PUSCH preparation time ($N_2$) for PUSCH timing capability 2 may be determined as one of values included in $[N_{2,min,cap2}, 5]$, one of values included in $[N_{2,min,cap2}, 5)$, one of values included in $(N_{2,min,cap2}, 5]$, or one of values included in $(N_{2,min,cap2}, 5)$.

The terminal and/or base station may process a PUSCH by using the PUSCH preparation time determined as above.

A time ($N_1$) required for a processing procedure of a physical downlink shared channel (PDSCH) is defined for each the terminal's capability and numerology (subcarrier spacing $\mu$) as shown in Table 6 (the case of PDSCH processing time for PDSCH processing capability 1) and Table 7 (the case of PDSCH processing time for PDSCH processing capability 2).

TABLE 6

| | PDSCH decoding time $N_1$ [symbols] | |
|---|---|---|
| $\mu$ | dmrs-AdditionalPosition = 'pos0' in DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 7

| $\mu$ | PDSCH decoding time $N_1$ [symbols] dmrs-AdditionalPosition = 'pos0' in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

Although not shown in Tables 6 and 7 above, when a subcarrier spacing lower than 15 kHz is used, an additional $N_1$ value may be used as a value lower than or equal to a preconfigured value. For example, a value lower than or equal to 15 kHz may be used. According to an embodiment of the disclosure, in the case where $\mu$=7.5 kHz ($\mu$=−1), a PDSCH processing time ($N_1$) for PDSCH processing capability 1 may be determined as one of values included in $[N_{1,min,cap1}, 8]$, one of values included in $[N_{1,min,cap1}, 8)$, one of values included in $(N_{1,min,cap1}, 8]$, or one of values included in $(N_{1,min,cap1}, 8)$. According to an embodiment of the disclosure, in the case where $\mu$=7.5 kHz ($\mu$=−1), a PDSCH processing time ($N_1$) for PDSCH processing capability 2 may be determined as one of values included in $[N_{1,min,cap2}, 3]$, one of values included in $[N_{1,min,cap2}, 3)$, one of values included in $(N_{1,min,cap2}, 3]$, or one of values included in $(N_{1,min,cap2}, 3)$.

The terminal and/or base station may process a PDCCH by using the PDCCH processing time determined as above.

A physical downlink control channel (PDCCH) and a PDSCH have different numerologies (subcarrier spacing u), and a PDSCH reception preparation time ($N_{pdsch}$) in the case where a carrier through which the PDCCH is transmitted and a carrier through which the PDSCH is transmitted are different (that is, cross-carrier scheduling) is defined for each numerology (subcarrier spacing u) as shown in Table 8 ($N_{pdsch}$ as a function of the subcarrier spacing of the scheduling PDCCH).

TABLE 8

| $\mu_{PDCCH}$ | $N_{pdsch}$ [symbols] |
|---|---|
| 0 | 4 |
| 1 | 5 |
| 2 | 10 |
| 3 | 14 |

Although not shown in Table 8 above, when a subcarrier spacing lower than 15 kHz is used, an additional $N_{PDSCH}$ value may be used as a value lower than or equal to a preconfigured value. For example, a value lower than or equal to 15 kHz may be used. According to an embodiment of the disclosure, the physical downlink control channel (PDCCH) and the PDSCH have different numerologies (subcarrier spacing $\mu$=7.5 kHz, $\mu$=−1), and the PDSCH reception preparation time ($N_{pdsch}$) in the case where the carrier through which the PDCCH is transmitted and the carrier through which the PDSCH is transmitted are different (that is, cross-carrier scheduling) may be determined as one of values included in $[N_{pdsch,min}, 4]$, one of values included in $[N_{pdsch,min}, 4)$, one of values included in $(N_{pdsch,min}, 4]$, or one of values included in $(N_{pdsch,min}, 4)$.

As such, according to various embodiments of the disclosure, a new subcarrier spacing is used (e.g., $\mu$=7.5 kHz ($\mu$=−1)), and thus timing-related parameters ($N_2$, $N_1$, $N_{pdsch}$) may be newly defined, and the newly defined values may be less than or equal to the corresponding values ($N_2$, $N_1$, $N_{pdsch}$) in the case where the subcarrier spacing is 15 kHz ($\mu$=0), respectively, and may have a rational number value greater than a specific value (the specific value is greater than 0).

In addition, according to various embodiments of the disclosure, new values may be defined for various parameters defined in Table 9 according to the use of a new subcarrier spacing. (The disclosure is described based on 7.5 kHz, but is not limited thereto.)

TABLE 9

| |
|---|
| The number of MIMO layers: The (maximum) number of MIMO layers to be supported (or supportable) by a carrier which supports 7.5 kHz ($\mu$ = −1) |
| MCS: MCS (maximum value) to be supported (or supportable) by a carrier which supports 7.5 kHz ($\mu$ = −1) |
| The maximum value of transport block size (TBS) |
| The number of subcarriers: The maximum number of subcarriers in a carrier which supports 7.5 kHz ($\mu$ = −1) |
| Whether the same (different) numerology is used between a PDCCH and a PDSCH/PUSCH (different BWPs and different carriers) |
| The number of blind decodings: Blind decoding configuration in a carrier which supports 7.5 kHz ($\mu$ = −1) (the maximum number of blind decodings and the maximum number of blind decodings which can be configured) |

TABLE 9-continued

| |
|---|
| DMRS configuration (whether front loaded DMRS or additional DMRS is configured) |
| peak data rate |
| RE-mapping |
| Scheduling method (14-symbol slot-based scheduling) |

Figure 12:
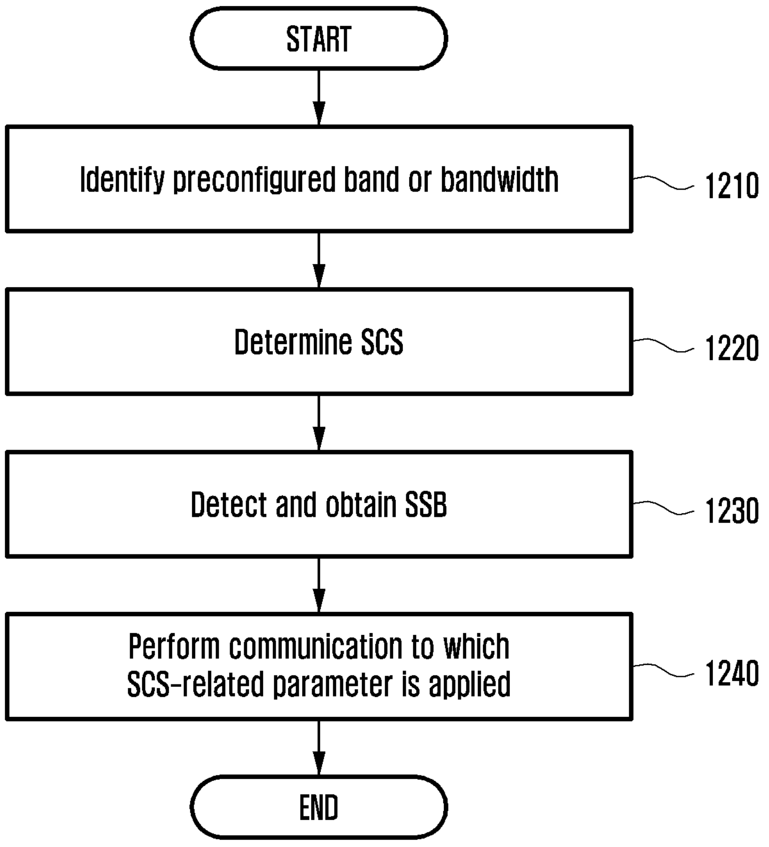
FIG. 12 is a diagram illustrating an operation of a terminal according to various embodiments of the disclosure.

FIG. 12 is a diagram illustrating an operation of a terminal according to various embodiments of the disclosure.

In operation 1210, the terminal may identify whether a band that the terminal itself desires to access is a preconfigured band, or whether the size of a frequency band that the terminal itself desires to access is smaller than a preconfigured bandwidth. For example, the terminal may identify whether the preconfigured band is a specific band (e.g., band 8) using a narrow bandwidth or whether the preconfigured bandwidth (e.g., a bandwidth lower than 5 MHz) is used. Alternatively, depending on the configuration or type of the terminal, when the terminal is a terminal configured to access only a preconfigured band or a terminal configured to use a bandwidth narrower than a preconfigured bandwidth, the terminal may determine that a condition for operation 1210 is satisfied.

When it is determined in operation 1210 that the preconfigured band or the bandwidth narrower than the preconfigured bandwidth is used, in operation 1220, the terminal may determine that an SCS smaller than a preconfigured SCS is required to be used in the corresponding band. For example, the preconfigured SCS may be 15 kHz, and the SCS lower than 15 kHz may be 7.5 kHz, 3.75 kHz, etc.

In operation 1230, the terminal may obtain or detect an SSB by assuming that the SSB transmitted by the base station is generated and transmitted in consideration of the SCS smaller than the preconfigured SCS. A specific configuration of the SSB refers to a configuration of an SSB according to various embodiments of the disclosure. In addition, the terminal may receive a configuration of a resource for CORESET #0 by using the SCS smaller than the preconfigured SCS, and identify the resource.

In operation 1240, the terminal may communicate with a base station. The terminal may control transmission and reception of a data channel by applying a processing time considering an SCS of a frequency band in which the terminal itself is operating. A specific example of the processing time refers to a configuration of a processing time according to various embodiments of the disclosure.

Figure 13:
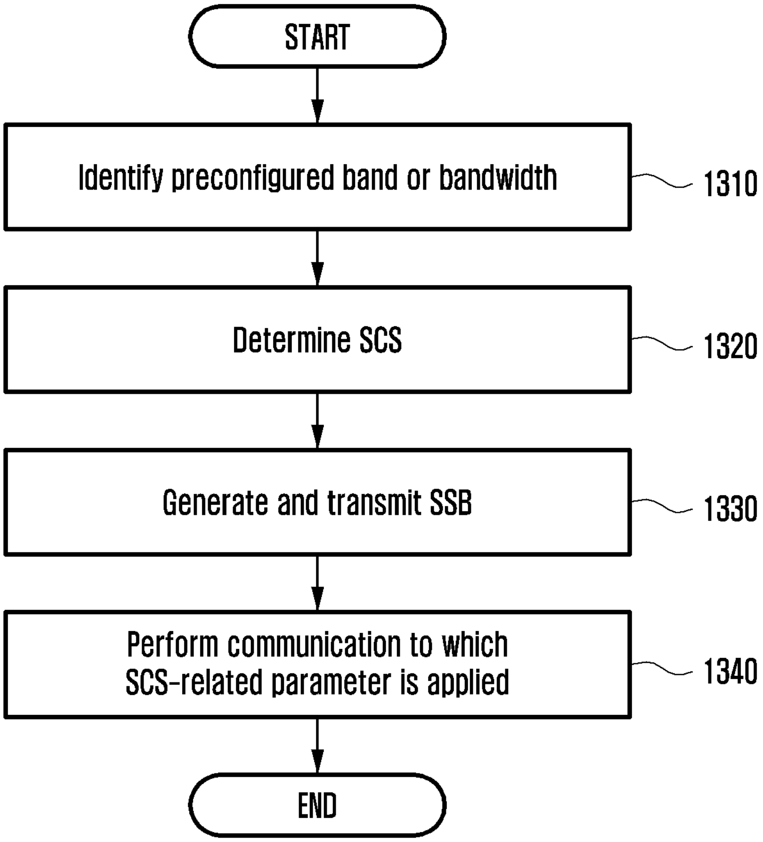
FIG. 13 is a diagram illustrating an operation of a base station according to various embodiments of the disclosure.

FIG. 13 is a diagram illustrating an operation of a base station according to various embodiments of the disclosure.

In operation 1310, the base station may identify whether a band that the base station itself desires to operate is a preconfigured band, or whether the size of a frequency band that the base station itself desires to operate is smaller than a preconfigured bandwidth. For example, the base station may identify whether the preconfigured band is a specific band (e.g., band 8) using a narrow bandwidth or whether the preconfigured bandwidth (e.g., a bandwidth lower than 5 MHz) is used.

When it is determined in operation 1310 that the preconfigured band or a bandwidth narrower than the preconfigured bandwidth is used, in operation 1320, the base station may determine that an SCS smaller than a preconfigured SCS is required to be used in the corresponding band. For example, the preconfigured SCS may be 15 kHz, and the SCS lower than 15 kHz may be 7.5 kHz, 3.75 kHz, etc.

In operation 1330, the base station may generate and transmit an SSB. The base station may generate or configure an SSB for the SCS smaller than the preconfigured SCS. A specific configuration of the SSB refers to a configuration of an SSB according to various embodiments of the disclosure. In addition, the base station may configure a configuration for CORESET #0 by using the SCS smaller than the preconfigured SCS.

In operation 1340, the base station may communicate with at least one terminal. The base station may control transmission and reception of a data channel by applying a processing time considering an SCS of a frequency band that the base station itself is operating. A specific example of the processing time refers to a configuration of a processing time according to various embodiments of the disclosure.

Figure 14:
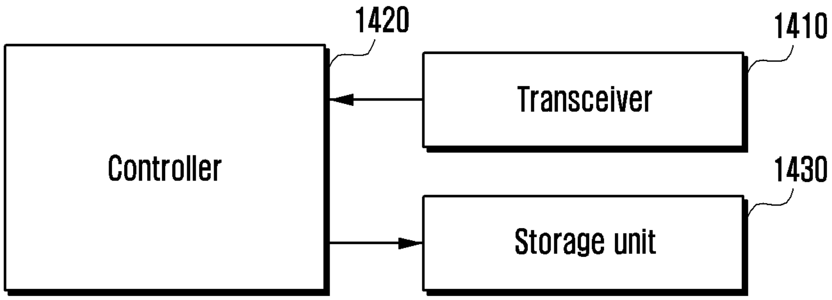
FIG. 14 is a diagram illustrating a structure of a terminal according to an embodiment of the disclosure.

FIG. 14 is a diagram illustrating a structure of a terminal according to an embodiment of the disclosure.

Referring to FIG. 14, the terminal may include a transceiver 1410, a controller 1420, and a storage unit 1430. In the disclosure, the controller 1420 may be defined as a circuit, an application-specific integrated circuit, or at least one processor.

The transceiver 1410 may transmit or receive a signal to or from other network entities. The transceiver 1410 may perform signal transmission and reception of the terminal of the disclosure described above.

The controller 1420 may control the overall operation of the terminal according to the embodiments proposed in the disclosure. The controller 1420 may obtain synchronization through an SSB according to various embodiments of the disclosure, process parameters configured based on a subcarrier spacing, and control transmission and reception of a PUSCH and a PDSCH by using a processing time.

In addition, the controller 1420 may perform control to identify whether a frequency band accessed by the terminal uses a bandwidth narrower than a preconfigured bandwidth, when the bandwidth narrower than the preconfigured bandwidth is used, determine a subcarrier spacing (SCS) smaller than a preconfigured SCS, and obtain a synchronization signal block (SSB) by using the determined SCS. In addition, a control resource set0 (CORESET) for a system information block (SIB1) may be identified based on a master information block (MIB) of the SSB, and the CORESET may be identified based on the determined SCS. In addition, a symbol to which a primary synchronization signal (PSS) of the SSB is mapped, a symbol to which a secondary synchronization signal (SSS) is mapped, and a symbol to which a physical broadcast channel (PBCH) is mapped may be discontinuously located. The storage unit 1430 may store at least one of information transmitted or received through the transceiver 1410 and information generated through the controller 1420.

Figure 15:
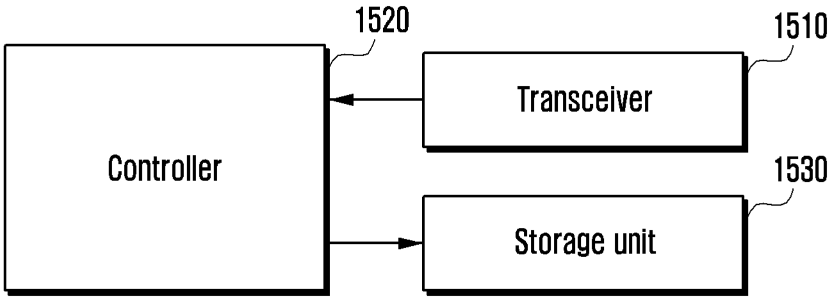
FIG. 15 is a diagram illustrating a structure of a base station according to an embodiment of the disclosure.

FIG. 15 is a diagram illustrating a structure of a base station according to an embodiment of the disclosure.

Referring to FIG. 15, the base station may include a transceiver 1510, a controller 1520, and a storage unit 1530. In the disclosure, the controller 1520 may be defined as a circuit, an application-specific integrated circuit, or at least one processor.

The transceiver 1510 may transmit or receive a signal to or from other network entities.

The controller 1520 may control the overall operation of the base station according to the embodiments proposed in the disclosure. The controller 1520 may configure an SSB according to various embodiments of the disclosure, process parameters configured based on a subcarrier spacing, and control transmission and reception of a PUSCH and a PDSCH by using a processing time.

In addition, the controller 1520 may perform control to identify whether a frequency band operated by the base station uses a bandwidth narrower than a preconfigured bandwidth, when the bandwidth narrower than the preconfigured bandwidth is used, determine a subcarrier spacing (SCS) smaller than a preconfigured SCS, generate a synchronization signal block (SSB) by using the determined SCS, and transmit the SSB. In addition, a control resource set0 (CORESET) for a system information block (SIB1) may be identified based on a master information block (MIB) of the SSB, and the CORESET may be identified based on the determined SCS. In addition, a symbol to which a primary synchronization signal (PSS) of the SSB is mapped, a symbol to which a secondary synchronization signal (SSS) is mapped, and a symbol to which a physical broadcast channel (PBCH) is mapped may be discontinuously located.

The storage unit 1530 may store at least one of information transmitted or received through the transceiver 1510 and information generated through the controller 1520.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. Moreover, the embodiments of the disclosure may also be applied to other communication systems, and other variants based on the technical idea of the embodiments may also be implemented.

The invention claimed is:

1. A method performed by a base station in a wireless communication system, the method comprising:
- identifying a frequency band;
- in case that a size of the frequency band is smaller than a size of a preconfigured bandwidth, determining a size of a subcarrier spacing (SCS) to be used on the frequency band, wherein the determined size of the SCS is smaller than 15 kHz;
- generating a synchronization signal block (SSB), based on the determined size of the SCS; and
- transmitting the SSB on the frequency band,
- wherein the SSB is mapped to a plurality of non-consecutive orthogonal frequency division multiplexing (OFDM) symbols within a slot based on the determined size of the SCS being smaller than 15 kHz.

2. The method of claim 1,
- wherein a master information block (MIB) of the SSB includes SCS information related to a control resource set (CORESET) for system information block (SIB) 1, and
- wherein the SCS information includes a first indicator indicating whether an SCS of the CORESET is identical to the SCS of the SSB, or a second indicator indicating a scaling factor between the SCS of the CORESET and the SCS of the SSB.

3. The method of claim 1, wherein a resource through which the SSB is transmitted does not conflict with a resource through which a cell specific reference signal (CRS) of a long term evolution (LTE) base station is transmitted.

4. The method of claim 1, wherein the size of the preconfigured bandwidth is 4 MHz or smaller, and the determined size of the SCS is smaller than 15 kHz.

5. A method performed by a terminal in a wireless communication system, the method comprising:
- identifying a frequency band;
- in case that a size of the frequency band is smaller than a size of a preconfigured bandwidth, determining a size of a subcarrier spacing (SCS) to be used on the frequency band, wherein the determined size of the SCS is smaller than 15 kHz;
- detecting a synchronization signal block (SSB), based on the determined size of the SCS; and
- identifying synchronization, based on the SSB, wherein the SSB is mapped to a plurality of non-consecutive orthogonal frequency division multiplexing (OFDM) symbols within a slot based on the determined size of the SCS being smaller than 15 kHz.

6. The method of claim 5, wherein a master information block (MIB) of the SSB includes SCS information related to a control resource set (CORESET) for system information block (SIB) 1, and wherein the SCS information includes a first indicator indicating whether an SCS of the CORESET is identical to the SCS of the SSB, or a second indicator indicating a scaling factor between the SCS of the CORESET and the SCS of the SSB.

7. The method of claim 5, wherein a resource through which the SSB is transmitted does not conflict with a resource through which a cell specific reference signal (CRS) of a long term evolution (LTE) base station is transmitted.

8. The method of claim 5, wherein the size of the preconfigured bandwidth is 4 MHz or smaller, and the determined size of the SCS is smaller than 15 kHz.

9. A base station in a wireless communication system, the base station comprising:

a transceiver; and a controller, wherein the controller is configured to perform control to:

identify a frequency band;

in case that a size of the frequency band is smaller than a size of a preconfigured bandwidth, determine a size of a subcarrier spacing (SCS) to be used on the frequency band, wherein the determined size of the SCS is smaller than 15 kHz;

generate a synchronization signal block (SSB), based on the determined size of the SCS; and transmit the SSB on the frequency band, and wherein the SSB is mapped to a plurality of non-consecutive orthogonal frequency division multiplexing (OFDM) symbols within a slot based on the determined size of the SCS being smaller than 15 kHz.

10. The base station of claim 9, wherein a master information block (MIB) of the SSB includes SCS information related to a control resource set (CORESET) for system information block (SIB) 1, and wherein the SCS information includes a first indicator indicating whether an SCS of the CORESET is identical to the SCS of the SSB, or a second indicator indicating a scaling factor between the SCS of the CORESET and the SCS of the SSB.

11. The base station of claim 9, wherein a resource through which the SSB is transmitted does not conflict with a resource through which a cell specific reference signal (CRS) of a long term evolution (LTE) base station is transmitted.

12. The base station of claim 9, wherein the size of the preconfigured bandwidth is 4 MHz or smaller, and the determined size of the SCS is smaller than 15 kHz.

13. A terminal in a wireless communication system, the terminal comprising:

a transceiver; and a controller, wherein the controller is configured to perform control to:

identify a frequency band;

in case that a size of the frequency band is smaller than a size of a preconfigured bandwidth, determine a size of a subcarrier spacing (SCS) to be used on the frequency band, wherein the determined size of the SCS is smaller than 15 kHz;

detect a synchronization signal block (SSB), based on the determined size of the SCS; and identify synchronization, based on the SSB, and wherein the SSB is mapped to a plurality of non-consecutive orthogonal frequency division multiplexing (OFDM) symbols within a slot based on the determined size of the SCS being smaller than 15 kHz.

14. The terminal of claim 13, wherein a master information block (MIB) of the SSB includes SCS information related to a control resource set (CORESET) for system information block (SIB) 1, and wherein the SCS information includes a first indicator indicating whether an SCS of the CORESET is identical to the SCS of the SSB, or a second indicator indicating a scaling factor between the SCS of the CORESET and the SCS of the SSB.

15. The terminal of claim 13, wherein a resource through which the SSB is transmitted does not conflict with a resource through which a cell specific reference signal (CRS) of a long term evolution (LTE) base station is transmitted.

16. The terminal of claim 13, wherein the size of the preconfigured bandwidth is 4 MHz or smaller, and the determined size of the SCS is smaller than 15 kHz.

* * * * *